(12) United States Patent
Alfred et al.

(10) Patent No.: US 10,514,966 B2
(45) Date of Patent: Dec. 24, 2019

(54) PUSH-BASED EVENT STREAM PROCESSING

(71) Applicant: Microsoft Technology Licensing, LLC, Redmond, WA (US)

(72) Inventors: Andre Oneal Alfred, Redmond, WA (US); Gueorgui Chkodrov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 15/862,404

(22) Filed: Jan. 4, 2018

(65) Prior Publication Data

US 2019/0205185 A1  Jul. 4, 2019

(51) Int. Cl.
*G06F 15/16* (2006.01)
*G06F 9/54* (2006.01)
*H04L 29/08* (2006.01)

(52) U.S. Cl.
CPC .............. *G06F 9/542* (2013.01); *H04L 67/12* (2013.01); *H04L 67/26* (2013.01)

(58) Field of Classification Search
CPC .......... G06F 9/542; H04L 67/12; H04L 67/26
USPC ....................................................... 709/219
See application file for complete search history.

(56) References Cited

U.S. PATENT DOCUMENTS

| | | | | |
|---|---|---|---|---|
| 8,423,645 B2 * | 4/2013 | Jeffries | .............. | H04L 63/1416 709/226 |
| 2005/0018618 A1 * | 1/2005 | Mualem | .............. | H04L 63/1458 370/252 |
| 2006/0056391 A1 * | 3/2006 | Rana | ................. | H04L 29/06027 370/352 |
| 2007/0271573 A1 * | 11/2007 | Chandrasekaran | ..... | G06F 9/542 719/318 |
| 2014/0333776 A1 * | 11/2014 | Dedeoglu | .............. | H04N 7/181 348/159 |
| 2016/0173538 A1 * | 6/2016 | Ibrahimkutty | .......... | H04L 67/42 709/224 |
| 2017/0171234 A1 * | 6/2017 | Christian | ............ | H04L 63/1425 |
| 2018/0027020 A1 * | 1/2018 | Pallas | ................. | H04L 12/4641 726/1 |

(Continued)

OTHER PUBLICATIONS

"International Search Report & Written Opinion Issued in PCT Patent Application No. PCT/US18/067777", dated Mar. 29, 2019, 11 Pages.

(Continued)

*Primary Examiner* — Anthony Mejia
(74) *Attorney, Agent, or Firm* — Workman Nydegger

(57) ABSTRACT

Pushing an event that is identified within a data stream to a remote computer system. Event characteristic(s) that are to be searched for within the data stream are determined (e.g., in response to a query). The event(s) in the data stream is evaluated to determine if it includes the event characteristic mentioned above. If an event is determined to include the event characteristic, then the event may be pushed to the remote computer system. In this manner, the event may be responded to at the remote computer system. This process enables the events to be pushed in a very fast manner. Furthermore, the process of evaluating the events may happen without storing the events, which process further increases the speed of pushing the events.

20 Claims, 8 Drawing Sheets

(56) References Cited

U.S. PATENT DOCUMENTS

2018/0359363 A1* 12/2018 Moran ................ H04M 3/5191

OTHER PUBLICATIONS

Rodrigues, et al., "Cybersecurity and Network Forensics: Analysis of Malicious Traffic towards a Honeynet with Deep Packet Inspection", In the Journal of Applied Sciences, vol. 7, Issue 10, Oct. 18, 2017, 29 Pages.

* cited by examiner

PUSH-BASED EVENT STREAM PROCESSING

BACKGROUND

Computer systems and related technology have impacted many aspects of society. Indeed, a computer system's ability to process information has transformed the way we both live and work. As an example, computer systems can be coupled to one another and to other electronic devices to form both wired and wireless computer networks. Using these networks, computer systems and other electronic devices can stream electronic data amongst themselves. This streamed electronic data is often referred to as simply a "data stream," and a data stream may include multiple "events." Notably, an event is an identified occurrence that is present within a data stream. For example, an event may be the detection of a data packet that is formatted to include certain pre-defined characteristics.

As the number of connected (whether wired or wireless) computer systems (e.g., laptops, desktops, tablets, smartphones, smart watches, Internet of Things (IoT) devices, and so forth) continues to increase, the amount of streamed data also continues to increase. As such, the desire for individuals and companies to derive timely insights regarding such data is also growing rapidly.

The subject matter claimed herein is not limited to embodiments that solve any disadvantages or that operate only in environments such as those described above. Rather, this background is provided to illustrate only one example technology area where some embodiments described herein may be practiced.

BRIEF SUMMARY

At least some embodiments described herein relate to pushing an event that is identified within a data stream to a remote computer system. For example, embodiments may initially include accessing the data stream that is comprised of multiple events. The embodiments may also determine an event characteristic (though more than one event characteristic may be used) that is to be searched for within the data stream. Here, this event characteristic is a characteristic that the remote computer system is to be notified of.

The embodiments may further include an evaluation of event(s) in the data stream to determine if it includes the event characteristic mentioned above. Notably, this evaluation may be performed for multiple events in the data stream. If an event is determined to include the event characteristic, then the embodiments may push the event to the remote computer system. In this manner, the event may be responded to at the remote computer system. Additionally, in some embodiments, one or more filters are used to evaluate events as they arrive one by one, thereby efficiently evaluating events using filters.

As briefly discussed earlier, computer systems are able to stream data with other computer systems across a network. In some cases, terabytes worth of data are streamed across a network every second. Because of this large amount of data, it may be beneficial to analyze this data as it is being streamed as opposed to waiting until the data is saved in storage. With that said, traditional data analytics systems often require extensive time to complete their analyses because they do store the data prior to performing their analyses. As such, the traditional systems are often limited by how much data can be stored and analyzed. In contrast, the disclosed embodiments are not limited by storage abilities because the data is analyzed as it is streamed as opposed to analyzing the data after it is stored. Accordingly, the disclosed embodiments provide significant advantages because they are able to analyze data as it is being streamed from one computer system to another.

This Summary is not intended to identify key or essential features of the claimed subject matter nor is it intended to be used as an aid in determining the scope of the claimed subject matter. Instead, this Summary is provided to introduce a selection of concepts in a simplified form. These concepts are more fully described below in the Detailed Description.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
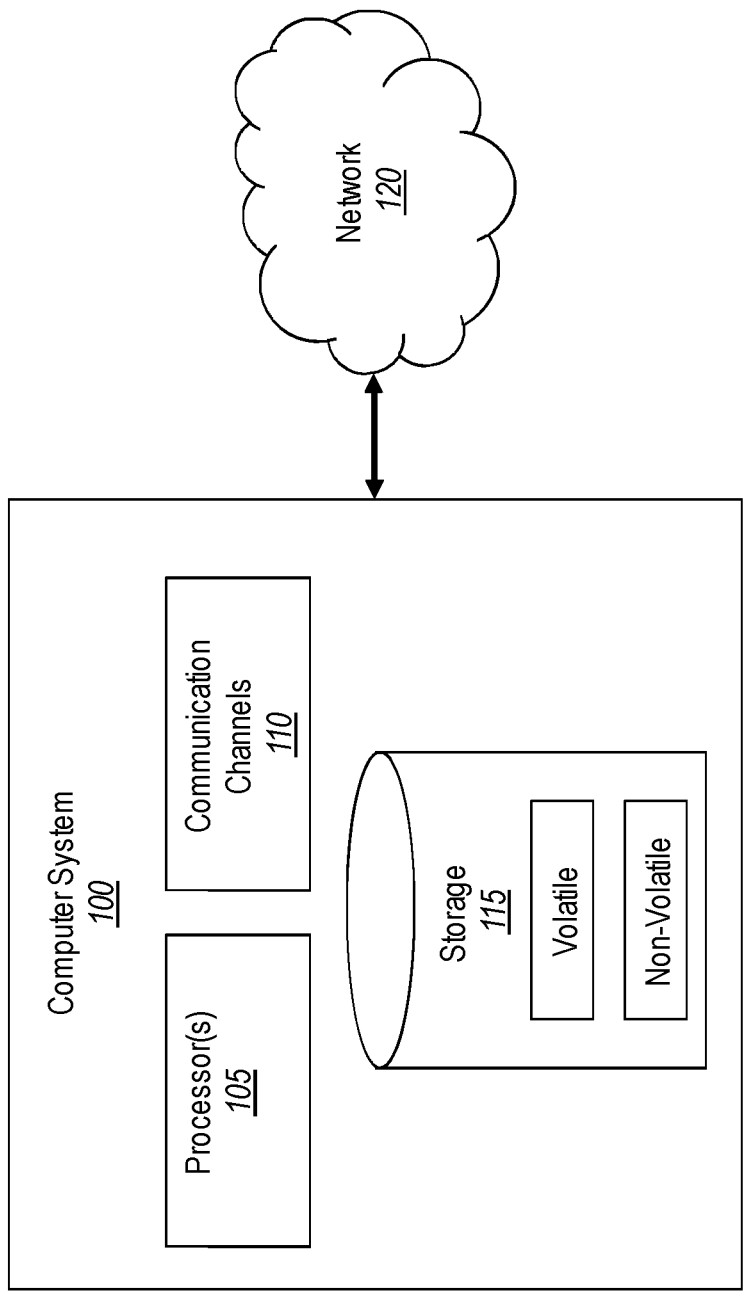
FIG. 1 illustrates an overview of an example computer system.

At least some embodiments described herein relate to pushing an event that is identified within a data stream to a remote computer system. For example, embodiments may initially include accessing the data stream that is comprised of multiple events. The embodiments may also determine an event characteristic (though more than one event characteristic may be used) that is to be searched for within the data stream. Here, this event characteristic is a characteristic that the remote computer system is to be notified of.

The embodiments may further include an evaluation of event(s) in the data stream to determine if it includes the event characteristic mentioned above. Notably, this evaluation may be performed for multiple events in the data stream. If an event is determined to include the event characteristic, then the embodiments may push the event to the remote computer system. In this manner, the event may be responded to at the remote computer system. Additionally, in some embodiments, one or more filters are used to evaluate events as they arrive one by one, thereby efficiently evaluating events using filters.

As briefly discussed earlier, computer systems are able to stream data with other computer systems across a network. In some cases, terabytes worth of data are streamed across a network every second. Because of this large amount of data, it may be beneficial to analyze this data as it is being streamed as opposed to waiting until the data is saved in storage. With that said, traditional data analytics systems often require extensive time to complete their analyses because they do store the data prior to performing their analyses. As such, the traditional systems are often limited by how much data can be stored and analyzed. In contrast, the disclosed embodiments are not limited by storage abilities because the data is analyzed as it is streamed as opposed to analyzing the data after it is stored. Accordingly, the disclosed embodiments provide significant advantages because they are able to analyze data as it is being streamed from one computer system to another.

With that understanding, the disclosed embodiments may be implemented to overcome many of the technical difficulties and computational expenses associated with analyzing data. To illustrate, conventional methods for analyzing data (i.e. data analytics) typically involve (1) storing the data, (2) preparing the stored data in some manner, (3) analyzing the stored data, and (4) obtaining results based on the analysis. Today, however, many networks pass terabytes of data every second. When faced with such a large amount of data, traditional methods for performing data analytics take a non-trivial amount of time and are often limited by how much data can be stored.

In contrast, the embodiments (by following the principles disclosed herein) are able to complete their data analytics in mere milliseconds, or at least a lot faster than with traditional methods. Therefore, the disclosed embodiments provide significant advantages over the art because they greatly improve the operational efficiency of (1) the network as a whole and (2) the underlying computers.

Having just described various advantages and high-level attributes of some of the disclosed embodiments, the disclosure will now focus on FIG. 1 which presents an introductory discussion of an example computer system. Following that discussion, the disclosure will focus on FIGS. 2 through 8. In particular, these Figures illustrate various architectures, supporting illustrations, and methods for providing event stream processing.

Example Computer System

As illustrated in FIG. 1, in its most basic configuration, a computer system 100 includes various different components. As used herein, "computer system" and simply "computer" are similar terms that may be interchanged with each other. FIG. 1 also shows that computer system 100 includes at least one hardware processing unit 105 (aka a "processor"), communication channels 110, and storage 115.

The storage 115 may be physical system memory, which may be volatile, non-volatile, or some combination of the two. Accordingly, the storage 115 may be referred to as a "hardware storage device" on which computer-executable instructions are stored. The term "memory" may also be used herein to refer to non-volatile mass storage such as physical storage media.

If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such as hardware processing unit 105) and system memory (such as storage 115), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., data acquisition devices). Further, the computer system 100 may also be connected through one or more wired or wireless networks 120 to remote systems(s) that are configured to perform any of the processing described with regard to computer system 100.

A "network," like the network 120 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated, the computer system 100 includes one or more communication channels 110 that are used to communicate with the network 120. One example of a communication channel is a computer port which will be described in more detail later.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

As discussed above, computer systems are able to provide a broad variety of different functions. According to the principles disclosed herein, the embodiments are able to provide real-time event stream processing. Indeed, some embodiments are able to perform this processing using various different network transport protocols (e.g., TCP, UDP, etc.). Further, some embodiments may be implemented in a standard-compliant way (e.g., HTTP over TCP) without introducing a new protocol. In this manner, events can be viewable on a user interface, which may be defined in HTML5 (or any other type of internet protocol or markup language). Accordingly, attention will now be directed to FIGS. 2 through 8, which figures present various architectures, supporting illustrations, and methods for processing a data stream to identify events and for pushing those events to remote computers.

Real-Time Event Stream Processing

Figure 2:
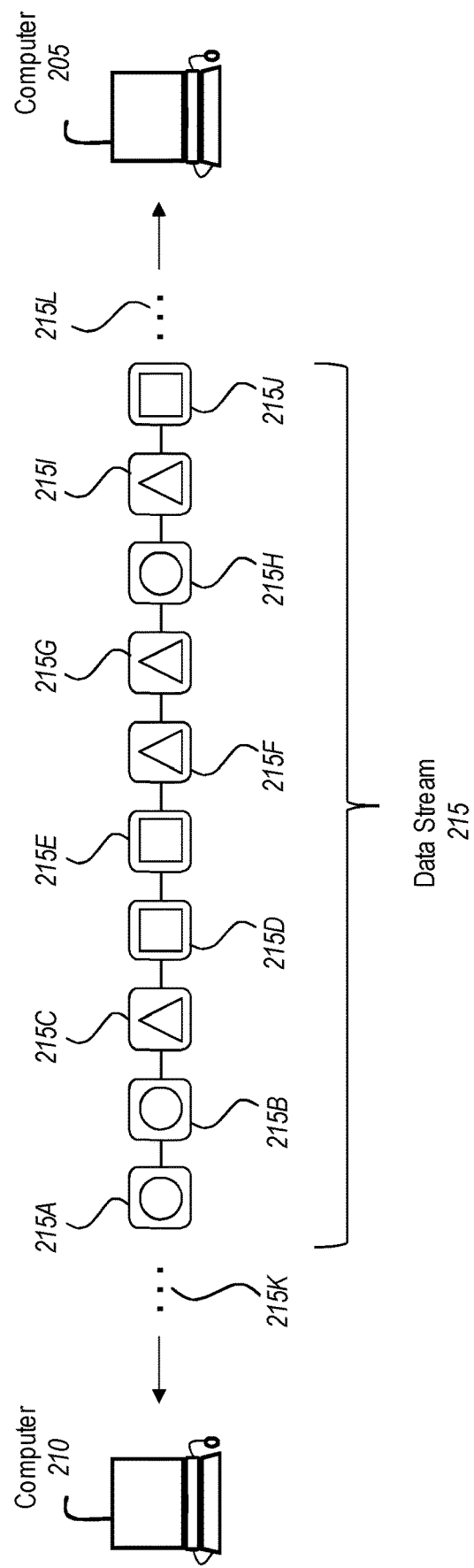
FIG. 2 illustrates how a computer can stream different types of events to another computer.

Having just described some of the features and functionalities that a computer may have, attention will now be directed to FIG. 2. Here, this figure illustrates an example scenario in which two computers are streaming information between themselves.

As shown, FIG. 2 includes a first computer 205 and a second computer 210. The first computer 205 and the second computer 210 may each be structured as described above for the computer system 100 of FIG. 1, though they may be any computer system capable of performing their respective functions described herein.

FIG. 2 also shows that a data stream 215 is being transmitted between the first computer 205 and the second computer 210. This data stream 215 may be transmitted using any type of network that exists between the two computers (e.g., the network 120 discussed in relation to FIG. 1). Furthermore, this data stream 215 is shown as including multiple events. As an example, data stream 215 includes event 215A, 215B, 215C, 215D, 215E, 215F, 215G, 215H, 215I, and 215J. The ellipses 215K and 215L demonstrate that the data stream 215 may include any number of events and may be an unbound length. As such, the embodiments are not limited simply to that which is illustrated in FIG. 2.

As discussed earlier, an event is an identified occurrence that is present within a data stream. As an example, an event may be the detection of a data packet that has been formatted to include certain pre-defined characteristics. FIG. 2 shows that the data stream 215 may include any number of different types of events. For example, the events symbolized as including the circle (i.e. events 215A, 215B, and 215H) are a first type of event. The events symbolized as including the triangle (i.e. events 215C, 215F, 215G, and 215I) are a second type of event. The events symbolized as including the square (i.e. events 215D, 215E, and 215J) are a third type of event. Although FIG. 2 shows only three different types of events, the embodiments are able to support any number of different types of events. Furthermore, the use of the circle, triangle, and square are simply for illustrative purposes to show that a data stream may include different types of events.

Figure 3:
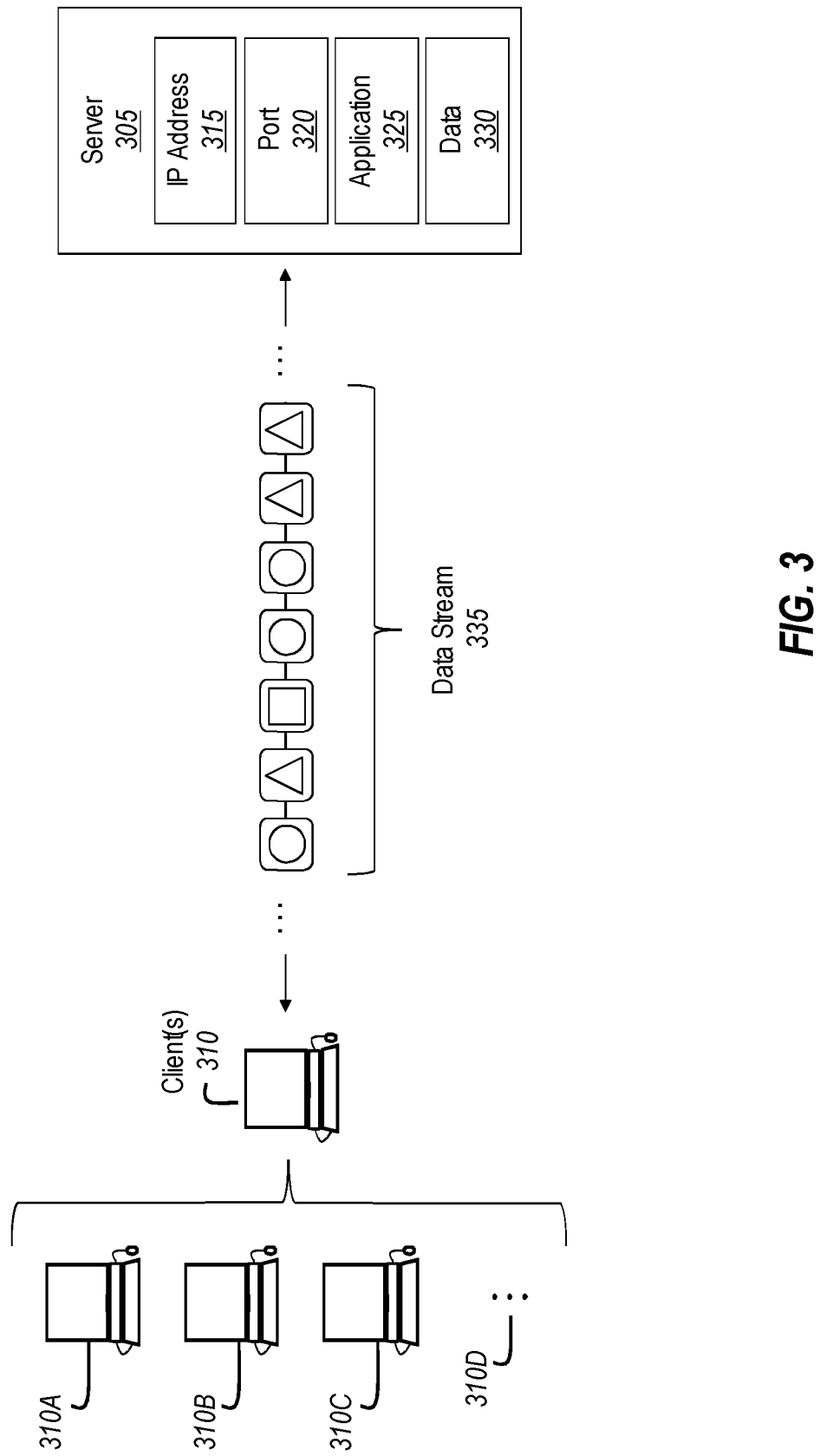
FIG. 3 illustrates how a server is able to stream data to one or more client computers.

FIG. 2 illustrated a situation in which two computers were streaming data (e.g., events) between themselves. In some situations, one of these computers may be a server (e.g., a web server) and the other may be a client. Such a scenario is illustrated in FIG. 3 in which a server 305 and a client 310 are illustrated. Here, the server 305 and the client 310 may include the features discussed in relation to computer systems 205 and 210 of FIG. 2. Additionally, although FIG. 3 shows that the server 305 is connected only to client 310, the server 305 may be in communication with any number of clients (i.e. the server 305 may stream data with any number of clients). As an example, the server 305 may communicate with client 310A, client 310B, or client 310C. Accordingly, the ellipses 310D demonstrates that any number of clients may be present.

Here, the server 305 includes various different features and/or components, such as, for example, an internet protocol (IP) address 315, a port 320, a server application 325, and/or data 330. The IP address 315 may be used to identify the server 305 to other computers. For instance, each computer connected to a network is assigned a unique IP address (e.g., IP address 315). In this manner, the networked computers are differentiated from one another.

When information is sent over a network (i.e. "streamed") to a computer that has an IP address (e.g., IP address 315), that information may be received at one (though perhaps more) of the computer's ports (e.g., port 320). Notably, an IP address is often associated with a large number of ports.

Furthermore, an IP address can be simultaneously associated with different types of ports. To illustrate, an IP address may be associated with a transmission control protocol (TCP) port and/or a user datagram protocol (UDP) port, just to name a couple. In some situations, a computer may include at least 65,535 TCP ports (i.e. $2^{16}$ minus one which is a 16-bit port protocol convention) and an equal number of UDP ports.

When an application (e.g., server application 325) causes data to be streamed, that application may attach itself to a particular port (e.g., port 320). Once attached, the application is then able to stream (e.g., transmit and/or receive) information from other networked computers via that port. As a result, the application may use a combination of the computer's IP address and a particular port to stream information with other networked computers.

Additional details on some of the various different types of ports will now be presented. First, it is noted that when networked computers communicate through the use of the transmission control protocol (TCP), those computers actually establish a direct linkage with each other. In some situations, a "direct linkage" may be considered as an API abstraction that TCP provides by retransmitting lost packets in a manner that is unbeknownst to an end user. For instance, when using this protocol, a transmitting computer will establish a direct link with a receiving computer. This link will be present throughout the entire course of a data transfer. In this manner, the data may be transferred securely and reliably. Once the data transfer is complete, the link will often be broken.

In contrast to the transmission control protocol (TCP), the user datagram protocol (UDP) transfers data by passing data packages through a series of "intermediate" network nodes. To illustrate, a transmitting computer will generate a package of data and then send this package to a first intermediate node in the network (e.g., another computer, a modem, a hub, a bridge, a switch, etc.). From there, the package can be delivered to any number of other intermediate nodes prior to reaching an endpoint (i.e. a receiving computer). Accordingly, with this protocol, the two computers are not connected directly to each other.

Although FIG. 3 shows a single port 320, the server 305 may include any number of ports. As a result, FIG. 3 is simply an example and should not be considered limiting. Furthermore, the port 320 should be interpreted broadly in that it may be embodied as a TCP port, a UDP port, or any other type of port. Accordingly, the combination of the IP address 315 and the port 320 enable the server 305 to communicate with other networked computers (e.g., client 310).

The server 305 is also configured to maintain/host digital content (e.g., a set of webpages). These webpages are stored as part of the data 330. In some cases, the server application 325 is configured to make these webpages available to other computers (e.g., the client 310). Similar to the disclosure presented above, the server application 325 is able to attach itself to a port (e.g., port 320) so as to make the data 330 accessible to the client 310.

FIG. 3 also shows a data stream 335 between the server 305 and the client 310. This data stream 335 is one example the data stream 215 of FIG. 2. Although not labeled, FIG. 3 shows that this data stream 335 includes various different types of events (e.g., the circle, triangle, and square events). Additionally, in some instances, this data stream 335 originates at the client 310 while in other instances the data stream 335 originates at the server 305. Accordingly, the double arrow line shown in connection with the data stream 335 emphasizes that either entity can initiate the process of streaming data. In some embodiments, the entirety of this data stream 335 is not stored in memory at any single time as it is being transmitted from one computer to the other (i.e. while it is being streamed).

Figure 4:
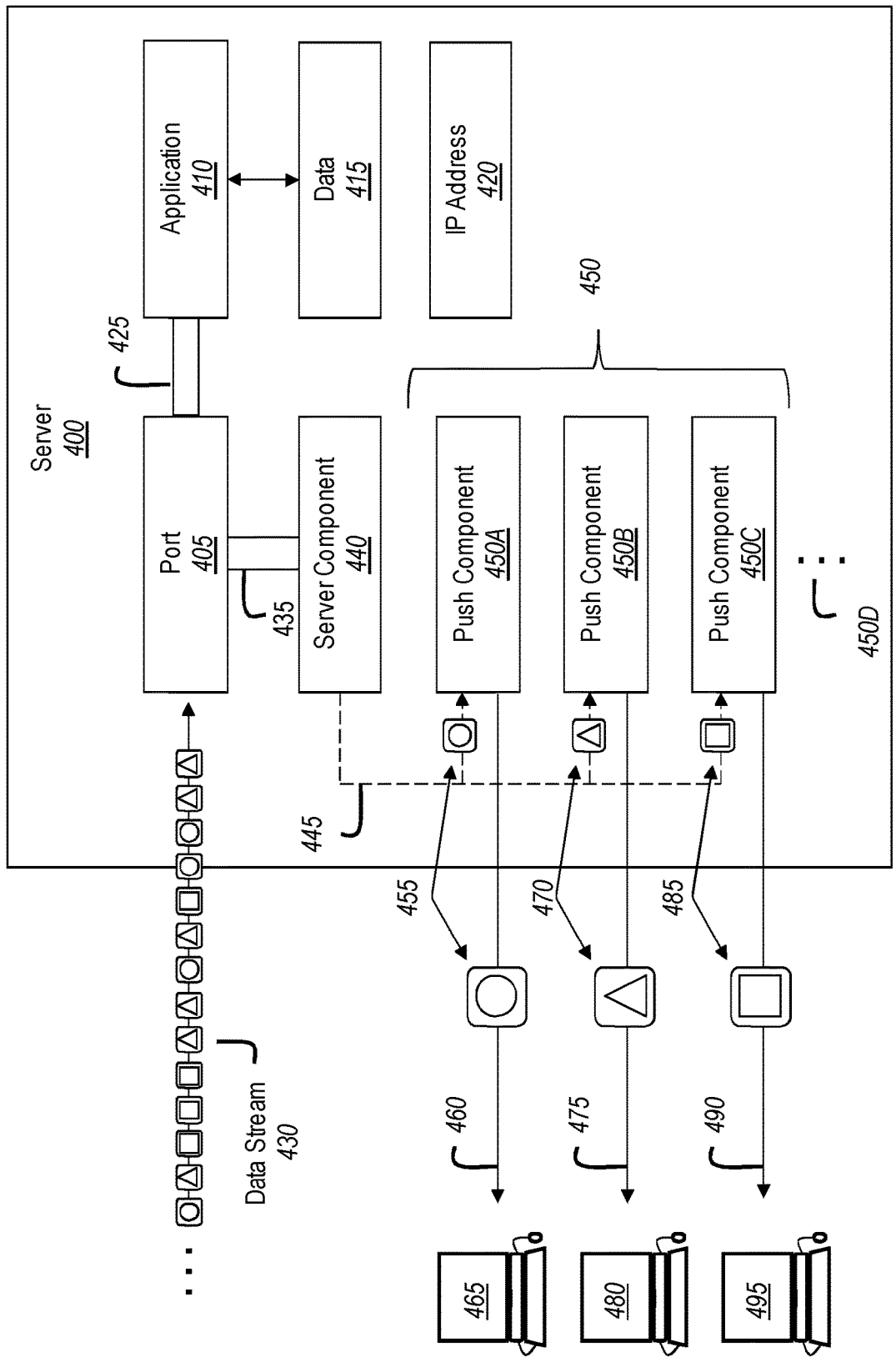
FIG. 4 presents an example architecture for performing push-based event processing.

Having just described a high-level overview of how data may be streamed between two computers, attention will now be directed to FIG. 4. Here, this figure illustrates an example architecture in which some of the disclosed embodiments may be realized. In particular, this architecture may be used to perform event processing on a data stream that includes multiple events. Further, this architecture may be used to push identified events to one or more remote computers.

As illustrated, FIG. 4 shows a server 400 which represents an example of the server 305 of FIG. 3. Furthermore, server 400 includes a port 405, a server application 410, data 415, and an IP address 420. These features and components are examples of the features and components discussed in relation to FIG. 3. As an example, the port 405 may be a TCP port, a UDP port, or any other type of port.

Additionally, FIG. 4 shows that the server application 410 is attached/bound (e.g., via attachment 425) to the port 405. In this manner, the server application 410 is able to use the port 405 to make the data 415 (e.g., webpages) accessible to remote computers. By way of example and not limitation, FIG. 4 shows that a data stream 430 may be transmitted between the server 400 and a different computer (not shown). This data stream 430 is one example of the data stream 335 shown in FIG. 3. Furthermore, although the different types of events are not labeled in the data stream 430, the server 400 is able to stream any number of different types of events.

According to some of the disclosed embodiments, the server 400 additionally includes a server component 440 that may also be attached/bound (e.g., via attachment 435) to the port 405. By being attached to the port 405, the server component 440 can be subscribed to a real-time data streaming source (i.e. the port 405). In this manner, the server component 440 is able to access the data stream 430 as it is being streamed (i.e. in real-time) through the use of the port 405. In some situations, this server component 440 is an in-memory component in that it may reside only in the server 400's memory. By "in-memory" component, it is meant that the server component 440 is instantiated in volatile memory space that is directly accessible by a processor as opposed to being a persisted component that is stored on a disk.

Figure 5:
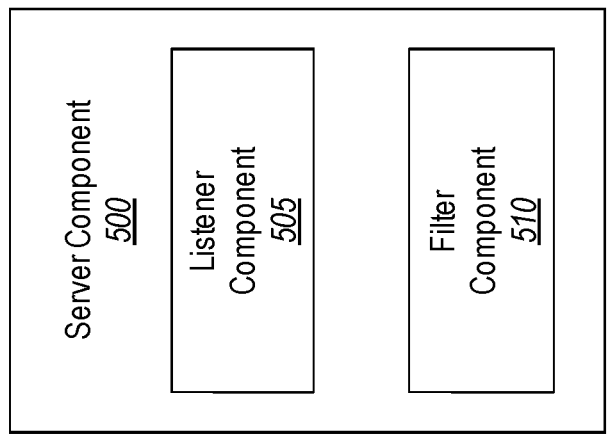
FIG. 5 shows an example of some of the sub-components that may be included in a server component, which may be used to identify events within a data stream.

Turning briefly to FIG. 5, this figure illustrates some of the various subcomponents of a server component 500 which is an example implementation of the server component 440 shown in FIG. 4. As shown, the server component 500 includes a listener component 505 and a filter component 510.

The listener component 505 is configured to listen to a port and monitor the data that is being streamed through the port (e.g., the data stream 430 shown in FIG. 4). Not only is the listener component 505 able to listen to the port, but it is also able to perform proactive operations on or against the data stream. For example, the listener component 505 (which is a part of the server component 500) is able to execute a query or a set of queries against the data stream to identify events from within that data stream. To clarify, a query may be executed against a data stream to identify one or more specific events. In particular, the query uses one or more pre-determined event characteristics in order to identify the specific events from within the data stream. In this manner, the server component 500 (and in particular the listener component 505) is able to execute queries against the data stream to perform an evaluation of an event to determine whether it includes one or more particular event characteristics.

Accordingly, a query may be executed to identify an event from within a data stream. In some instances, the query may include any number of different query parameters (e.g., event characteristics). These query parameters define the event that the query is designed to search for. In other words, the query parameters define the event characteristics that are used to identify an event.

As an example, query parameters may include, but are not limited to, a data packet type, a data packet length, a header type, a header length, a protocol type, or any other information that may be used to identify a defined data packet type from within a data stream (i.e. to identify an event). Furthermore, the server component 500 is able to receive a query or a set of queries from one or more remote computer systems. In such circumstances, these queries may define certain event characteristics that the remote computer systems are desirous to be notified of, as will be described in more detail later.

The disclosure will now provide additional details on this query aspect. For example, in some embodiments, the server component 500 is associated with a repository/database of pre-defined queries. In such situations, the listener component 505 is able to independently select queries from this repository and execute those queries against the data stream. In this manner, the listener component 505 includes query selection and execution intelligence.

Here, an example will be helpful. In some situations, the listener component 505 can initially monitor the data stream in a passive manner. If the listener component 505 detects a suspicious event (e.g., an event that indicates an attack is or may be in progress) or some other type of event occurrence, then the listener component 505 can begin to proactively select and execute queries against the data stream in an effort to acquire additional information. For instance, the listener component 505 is able to select pre-generated queries from its repository. Additionally or alternatively, the listener component 505 is able to dynamically generate new queries on its own. Indeed, as the listener component 505 acquires more information about the data stream and the events within that data stream, it is able to adjust which queries are selected (and/or generated) and executed against the data stream.

As an example only, sometimes a server will be subject to a brute force attack (i.e. a type of trial and error attack in which the server is bombarded with a large number of communications designed to "crack" encrypted data). If the conventional methodologies of analyzing data were used, then the attack will be long over by the time it was discovered. However, by analyzing the data stream in real-time (i.e. as the data stream is being streamed), then attacks can be identified and handled much faster. In light of this understanding, the listener component 505 may include machine learning abilities so as to intelligently select (and/or dynamically generate) and execute one or more queries against a data stream. In this manner, the listener component 505 is able to identify events as they are being streamed.

In other embodiments, the listener component 505 is able to receive a set of queries from one or more remote computers and/or developers. For example, a remote computer system (e.g., client 310 shown in FIG. 3) is able to submit a set of queries to the listener component 505. Additionally, a human developer who is locally using the computer on which the listener component 505 resides is able to submit a set of queries directly to the listener component 505. In this manner, the listener component 505 is able to receive and execute any number of queries from any number of entities. Here, the queries may be configured to identify any type of event from the data stream.

Other embodiments are able to employ a hybrid approach in which the listener component 505 may execute a set of client-based queries in combination with a set of queries selected and/or generated on its own volition. For example, the listener component 505 may initially receive a set of queries from a client. After analyzing the client-based set of queries, the listener component 505 is able to deduce the types of events that the client is interested in. Based on this understanding, the listener component 505 can then select (e.g., from its repository) and/or dynamically generate (e.g., based on its machine learning abilities) an additional set of queries to execute against the data stream. This additional set of queries may be executed in combination with the client-based set of queries in order to provide an event search that is more robust.

Once the queries are received (e.g., from the repository or from a client) and/or dynamically generated, then the listener component 505 can execute them against the data stream. As mentioned earlier, as the listener component 505 executes more and more queries, it is able to expand its intelligence. For example, as the listener component 505 works with more clients and queries, it will be able to better understand the parameters that a client is looking for when the client submits a query. Furthermore, it will be able to perform more advanced queries in the future. Even further, it will be able to generate more advanced computer-generated queries on its own. In this manner, the listener component 505 is able to learn from past operations in an effort to improve its future operations. Furthermore, the listener component 505 is able to store some or all of its previously executed queries in its repository in order to make its query abilities more comprehensive.

When the listener component 505 executes a query against the data stream and identifies a particular event based on that query, then the listener component 505 is said to have "hit" upon event. Using FIG. 4 as an example, suppose a query is designed to detect a triangle-type event in the data stream 430. In this manner, the listener component 505 will disregard the other types of events (e.g., the circle-type and the square-type events) and will generate a hit when the triangle-type events are identified. Accordingly, as used herein, a "hit" occurs when an event is identified within a data stream as a result of executing a query against that data stream.

FIG. 5 also shows the filter component 510. Here, the filter component 510 is able to perform front-end filtering operations on a data stream. For instance, the filter component 510 is able to filter portions of the data stream (e.g., data stream 430) so as to reduce the amount of data that is queried by the server component 500 (specifically the listener component 505). As discussed earlier, some networks stream terabytes of information every second. Accordingly, in some embodiments, the filter component 510 is able to perform filtering operations on the data stream in order to more efficiently identify an event within that data stream. In this manner, one or more filters may be applied when an event is being evaluated.

By way of example, the filter component 510 may be configured to filter out some (or all) data packets that begin with a particular header type. Additionally, the filter component 510 may be configured to filter out some (or all) data packets that exceed a threshold length or size. In other embodiments, the filter component 510 is configured to filter out data packets that use a particular protocol (e.g., TCP, UDP, etc.). In some instances, the filter component 510 is configured to filter out data packets that include a particular destination address, a particular originating address, or data packets that have a particular packet number (e.g., packets may not be transmitted in sequence, so they may include a packet sequence number). From this disclosure, it will be appreciated that the filter component 510 is able to perform a vast array of different filtering operations.

Returning to FIG. 4, because the server component 440 is attached to the port 405, it is able to access a data stream that includes multiple events. In this manner, the server component 440 is able to listen to the data stream 430 and execute queries against the data stream 430 to identify specific events from within that data stream 430. Stated differently, the server component 440 is able to determine one or more event characteristics that are to be searched for within the data stream.

The server 400 is also shown as including a number of push components 450. For example, the push components 450 include push component 450A, push component 450B, and push component 450C. The ellipses 450D demonstrates that the server 400 may include any number of push components. Although these push components 450 are shown as being distinct from the server component 440, some embodiments configure the server component 440 to include the push components 450. In other words, some embodiments cause the push components 450 to be a part of the server component 440. Further detail on these push components 450 will be presented momentarily.

FIG. 4 also shows various other remote computer systems (e.g., computer systems 465, 480, and 495). As discussed earlier, the embodiments are able to receive one or a set of queries from one or more remote computer systems. Here, computer system 465, computer system 480, and computer system 495 have each submitted one or more queries that they would like the server component 440 to execute against the data stream 430. In other words, these remote computer systems would like the server component 440 to examine the data stream 430 and search for events that have specific event characteristics based on their submitted queries. Additionally, these event characteristics are characteristics that each remote computer system is desirous to be notified of. As discussed, the server component 440 is also able to augment these queries to included additional/more specific event characteristics and/or additional queries.

To have the server component 440 identify events for a remote computer system, that remote computer system (e.g., computer system 465, 480, or 495) may initially register itself with the server component 440. Here, this registration process may include the remote computer system identifying itself to the server component 440 (e.g., by giving the server component 440 its IP address). The registration process may also include the remote computer system submitting one or more queries to the server component 440. Further, the registration process may include instantiating a new push component that is to be associated with the remote computer system. Additionally, the registration process may include initiating a communication connection/link between the remote computer system and the newly formed push component.

In this manner, the server component 440 will know which events the remote computer system is to be notified of because the server component 440 received the remote computer system's queries. As an example, a communication connection may be established and maintained between a computer system (e.g., server 400) and a remote computer system (e.g., computer system 465) while the data stream 430 is being streamed and evaluated. As a consequence, the process of pushing an event to the remote computer system may be performed using the communication connection. In some instances, this communication connection is a point to point PCP connection. As a result, some embodiments can use a normal http protocol to maintain this connection.

When the server component 440 executes a remote computer system's query (more than one query may be executed for the remote computer system) and receives a hit on an event, then the server component 440 is able to pass the event to the remote computer system's corresponding push component. Using FIG. 4 as an example, push component 450A is registered to computer system 465, push component 450B is registered to computer system 480, and push component 450C is registered to computer system 495.

To further clarify, the computer system 465 previously submitted one or more queries to the server component 440. These queries informed the server component 440 that the server component 440 is to identify a specific type of event from within the data stream 430. In the scenario presented in FIG. 4, the computer system 465 is to be notified of circle-type events (e.g., event 455). Similarly, computer system 480 is to be notified of triangle-type events (e.g., event 470), and computer system 495 is to be notified of square-type events (e.g., event 485).

Accordingly, when the server component 440 identifies a circle-type event (e.g., event 455), then the server component 440 will pass (e.g., pass operation 445) that event to the push component 450A. Similar operations will be performed for the triangle-type and square-type events (i.e. the push component 450B will receive triangle type events, and the push component 450C will receive square-type events). Once the push component 450A receives a circle-type event (i.e. event 455), then it is able to use the communication link that was previously established with computer system 465 (through the registration process) to push (e.g., push operation 460) the circle-type events (e.g., event 455) to the computer system 465. Similarly, push component 450B is able to push (e.g., push operation 475) the triangle-type events (e.g., event 470) to the computer system 480, and push component 450C is able to push (e.g., push operation 490) the square-type events (e.g., event 485) to the computer system 495.

In some instances, the computer systems 465, 480, and 495 will use a web browser to register with the server component 440. In these situations, the web browsers are registered with the server component 440, and an identified event will be pushed to the registered web browser.

Therefore, for at least some of the events in the data stream, the embodiments are able to evaluate each event to determine if it includes one or more event characteristics that a remote computer system is to be notified of. If the event is determined to include the event characteristics, then the event may be pushed to the remote computer system so that it is responded to at the remote computer system (e.g., the remote computer can display the event on its user interface). If the event is determined to not include the event characteristics, then no further work may be performed (e.g., the event can be discarded).

As an example, the server component 440 is able to execute queries against the data stream 430 to evaluate an event to determine whether the event includes one or more specific event characteristics. As shown in FIG. 4, this server component 440 may be attached to a port (e.g. port 405) which is used to stream the data stream 430.

In this manner, the embodiments are able to perform data analytics in mere milliseconds because the data (i.e. the event(s)) is not being written to disk. Further, only a small amount of memory may be consumed because the events may be discarded after being pushed by the push components 450. To clarify, in some instances, the event may be stored in memory until such time as the push components 450 complete their pushing operations. In this manner, the embodiments do not accumulate events because they do not use storage to persist those events. Accordingly, because the events are not persisted to storage, the embodiments are able to perform data analytics in an extremely fast manner (e.g., 1 millisecond, 2 milliseconds, 3 milliseconds, 4 milliseconds, 5 milliseconds, or any number of milliseconds). In this manner, the embodiments are able to analyze many thousands of data packets in a data stream each second (e.g., some embodiments are able to analyze more than 300,000 data packets per second).

Figure 6:
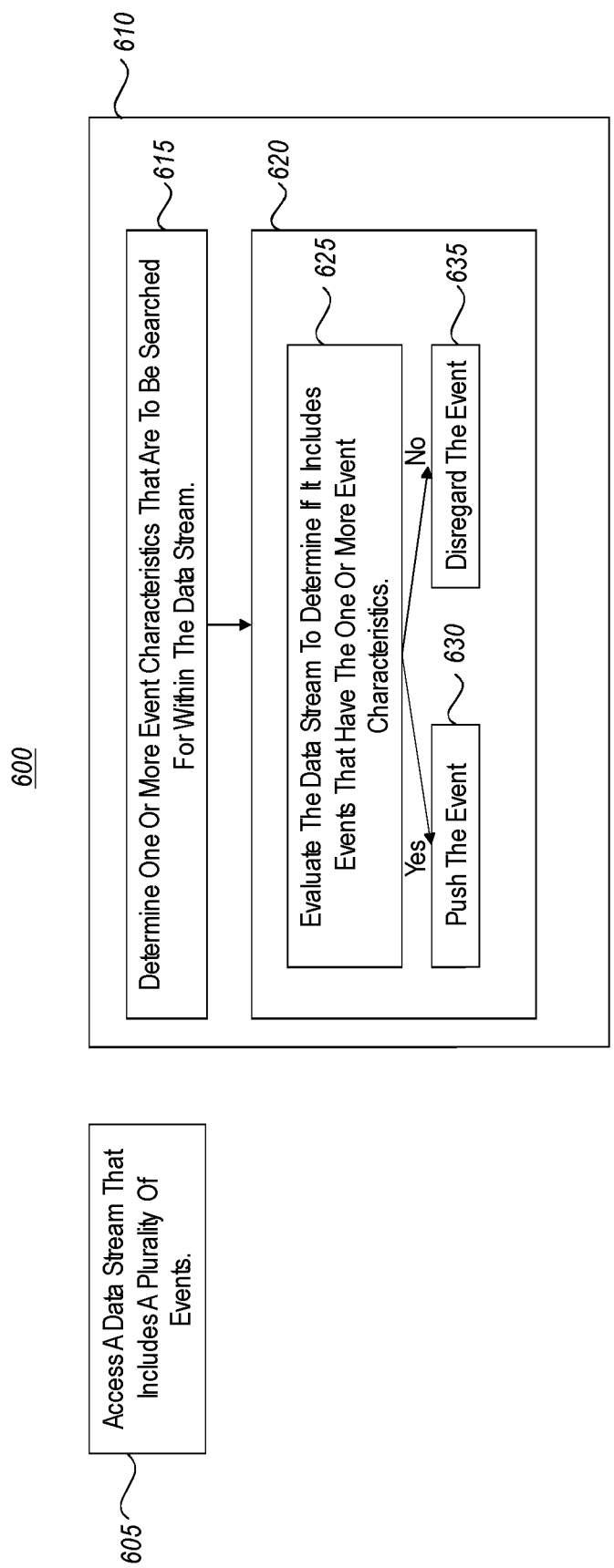
FIG. 6 presents an example method for performing bush-based event processing.

Turning now to FIG. 6, this figure illustrates an example method 600 for performing event processing on a data stream that includes multiple events (e.g., the data stream 430 of FIG. 4). Of note, this method 600 may be performed by the server 400 shown in FIG. 4 and/or any of the computer systems discussed thus far.

In particular, method 600 is shown as including various different acts or acts. Here, some of these acts are shown as being side-by-side to each other. In this manner, these acts may be performed in parallel and may be performed without a temporal dependence on each other.

With that understanding, it is noted that method 600 includes an act of accessing a data stream that includes multiple events (act 605). For example, the data stream may be the data stream 430 discussed in FIG. 4. Here, this act may be performed by the server component 440 of FIG. 4. In some embodiments, the server component 440 may use a Rx.NET to bind itself to a port (e.g., a TCP port, a UDP port, or any other type of port) so as to listen for HTTP syntax when accessing the data stream. In this manner, the server component 440 may be subscribed to a real-time streaming source and may access the data stream by accessing a port through which the data stream is being transmitted.

Method 600 includes another act 610. Here, this act 610 is performed for at least one remote computer system (e.g., one or more of computer systems 465, 480, and 495 shown in FIG. 4). In particular, this act 610 includes various sub acts. To illustrate, act 610 includes an act of determining one or more event characteristics that are to be search for within a data stream (act 615). Notably, these event characteristics are characteristics that the remote computer system is to be notified of. Here, this act may be performed by the listener component 505 shown in FIG. 5. As another example, the embodiments may evaluate the data stream to determine that a first event from within the data stream includes the one or more event characteristics. In some instances, this act is performed by executing a query against the data stream using the one or more event characteristics to identify some of the events.

After act 615, method 600 includes another sub-act (i.e. act 620). Here, act 620 may be performed for each of at least some of the multiple events of the accessed data stream. As shown, sub-act 620 initially includes an act of evaluating the data stream to determine if it includes an event that has one or more specific event characteristics (act 625). Stated differently, this act includes the process of evaluating an event to determine if it includes the one or more event characteristics that the remote computer system is to be notified of. Here, this act may also be performed by the listener component 505.

If the event is determined to include the one or more event characteristics (i.e. the "Yes" trail), then the event may be pushed to the remote computer system so that the event may be responded to at the remote computer system (act 630). Here, this act may be performed by one or more of the push components 450 shown in FIG. 4. In some embodiments, this act is performed without storing (i.e. persisting) at least some (or even perhaps any) of the pushed events.

In some instances, the event is one of multiple events that are pushed to a remote computer system. Furthermore, pushing the event may be performed in an asynchronous manner. To clarify, pushing the events to the remote computer systems is not confined to an order of the events as those events are presented within the data stream. Furthermore, as shown in FIG. 4, there may be multiple push components that are pushing multiple events. In situations where the push components 450 are parts of the server component 440, then the push components 450 may also perform part of the event evaluation with respect to a subset of the data stream. In other words, in some embodiments, the push components 450 may partially determine whether the events include specific event characteristics.

Alternatively, if the event is determined to not include the event characteristics, then no further work may be performed (e.g., the event may be disregarded) (act 635). Notably, the listener component 505 is able to perform this act.

Here, the embodiments are able to push any number of events to any number of different remote computer systems. To illustrate, the embodiments may identify one or more other events from within the data stream. These other events may include other event characteristics that a second remote computer system is to be notified of. Thereafter, the embodiments may push these other events to the second remote computer system. Furthermore, some embodiments cause the events to be compatible with HTML5 such that the events are viewable on any web browser in a standard-compliant manner.

In some embodiments, the push components 450 may be a "callback." As used herein, a "callback," is a function or process that is itself passed as an argument (or parameter) to another function or process. When a certain condition is met (e.g., the occurrence of a particular event), then a callback may be triggered. In the event-driven processing disclosed herein, a main operation (e.g., the server component 440) is configured to listen for the occurrence of a particular event. When such an event occurs, then a callback (e.g., one or more of the push components 450) will be triggered to respond to the occurrence of that event. As an example of a callback, consider a graphical user interface (GUI). When a user is not performing any operations on the GUI (e.g., clicking a button), then the GUI will not react. If, however, the user clicks a button, then the GUI reacts by performing various processes in accordance with the clicked button. In this example, the click of the button is an event, and the GUI listened for that event and performed a callback when the event occurred.

As illustrated above, callbacks may be different than polling operations. In a polling operation, the status of a particular entity is continuously or periodically queried to determine when some condition is met. In contrast, a callback is performed only upon the detection of an event. When the event occurs, then a callback is triggered and certain operations follow. In this manner, an entity's state is disregarded until such time as the event actually occurs. By performing a callback, the embodiments consume fewer computing resources than systems that repeatedly perform polling operations. In some embodiments, triggering a callback is performed by dynamically converting an event into JSON-Objects that can be read by browsers compatible with HTML5 server-side events. Such a process can be performed with mere microseconds of latency. Accordingly, in some embodiments, the process of pushing an event to a remote computer system may be performed by a callback that resides on a server. In this manner, a callback may be registered with a remote computer system as was described above in relation to a push component.

Other embodiments, however, do not configure the push components 450 as callbacks. Instead, the push components 450 may be configured to receive events and redirect (i.e. push) them to remote computer systems. Accordingly, the disclosure presented above is simply one example scenario and should not be considered limiting.

Example Implementations

Having just described various principles, some practical examples will now be presented. Accordingly, attention will now be directed to FIGS. 7 and 8 which illustrate different example uses of the disclosed embodiments.

Figure 7:
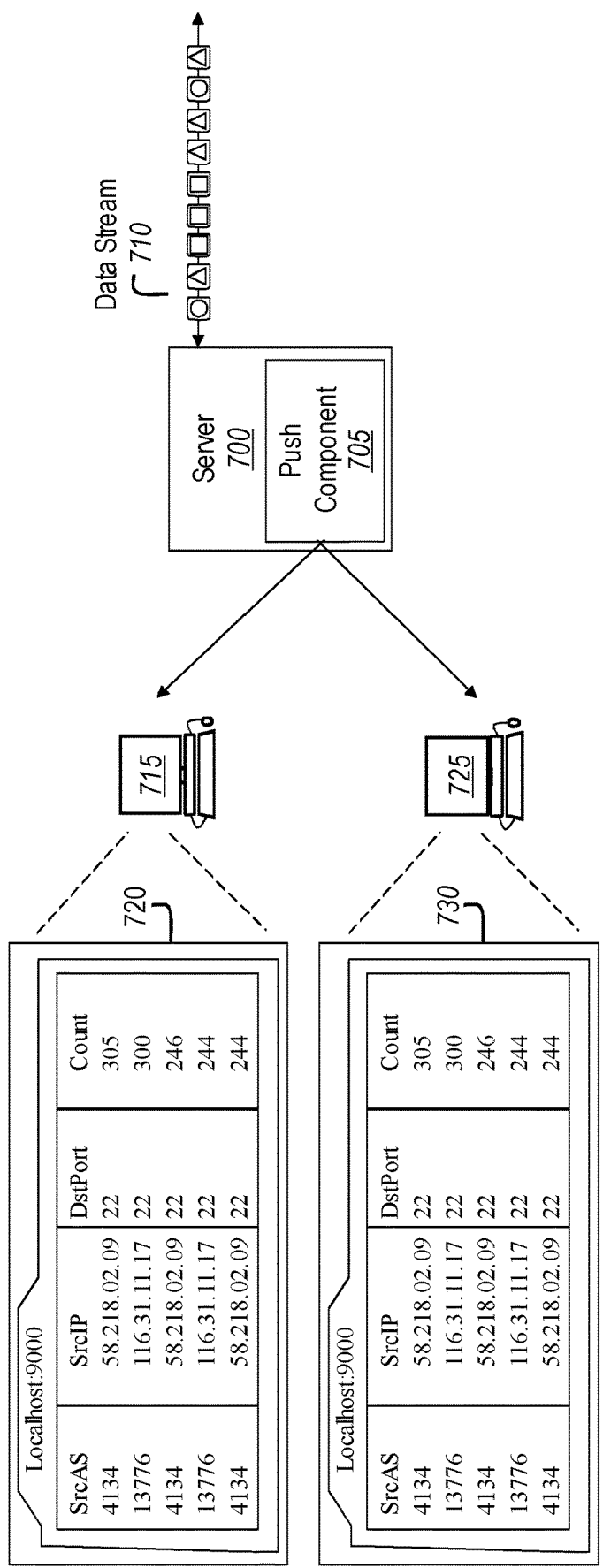
FIG. 7 illustrates one example scenario in which push-based event processing is being used to identify an attack against a server.

Turning first to FIG. 7, this figure shows a server 700 that includes a push component 705. As illustrated, this server 700 is receiving and/or transmitting a data stream 710. Additionally, FIG. 7 shows a first client 715 that has a browser 720 and a second client 725 that has a browser 730. Of note, the browsers 720 and 730 are each registered with a corresponding push component on the server 700 (e.g., the push component 705). In some situations, multiple clients may be registered with the same push component (as shown in FIG. 7). When such situations occur, it means that the clients are interested in the same type of event.

In this example scenario, the clients 715 and 725 have submitted a set of queries to the server 700. In particular, the clients 715 and 725 submitted the queries to an in-memory server component that is attached to a port on server 700, as generally shown in FIG. 4. In this example, the queries were designed to identify various events associated with a brute force attack. As the in-memory server component identifies these events by executing the queries, the push component 705 is triggered in that it receives the events from the server component. As a result of being triggered, the push component 705 will then push the events to the browsers 720 and 730.

In the scenario of FIG. 7, the push component 705 is not only able to identify (and push) events related to a brute force attack from one (or more) IP addresses in a network to the outside world (and vice versa), but it is also able to identify a determined number of entities who may be conducting the brute force attack. To clarify, by analyzing the data stream 710, the embodiments are able to identify various events related to a brute force attack. Additionally, the push component 705 can then use those events to determine which entities (e.g., the SrcIP) are suspected of conducting the attack. For example, in FIG. 7, the SrcIP identified as 58.218.02.09 is a suspect because it attempted to talk to 305 other IPs using port 22 (e.g., a Secure Shell or sFTP). Here, the push component 705 may be configured to produce a determined number of suspects during a determined period of time (e.g., every 1 second, every 2 seconds, every 3 seconds, etc.). Furthermore, these embodiments are able to count the number of events that are associated with each of these suspected entities and have those events displayed on a user interface, as shown in FIG. 7. Those events (i.e. the events related to the suspected entities) and the number of counts (i.e. how often the events occur) can then be displayed on the browsers 720 and 730. Accordingly, the embodiments may be practiced in an effort to identify entities who are suspected of conducting an attack against the server 700. From this disclosure, it will be appreciated that the push component 705 is able to push all events, no events, or a selected number of events to the browsers 720 and 730.

In some embodiments, this information (e.g., the events) is made accessible in an almost instantaneous manner (i.e. mere milliseconds) because the embodiments do not persist the events to storage. Instead, the events may be discarded or ignored after the push component 705 completes pushing those events.

The above example was focused on a scenario in which an attack was occurring between some IP addresses and some other target computers. Of note, however, the embodiments may be used for other purposes as well. For example, FIG. 8 shows an example scenario in which various client browsers are able to almost immediately see an image as it is being drawn on a canvas.

Figure 8:
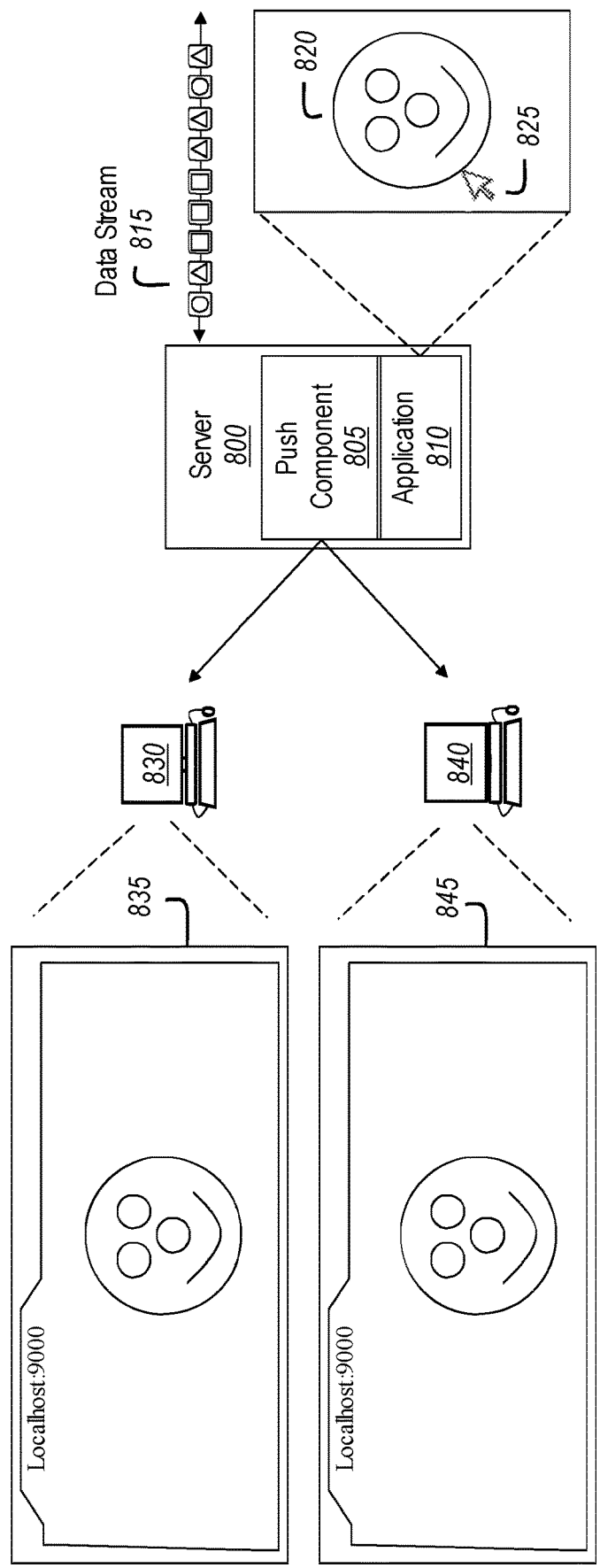
FIG. 8 illustrates another example scenario in which push-based event processing is being used to identify drawing events as they are being performed.

Specifically, FIG. 8 shows a server 800 that includes push component 805 and an application 810. Here, the server 800 is transmitting and/or receiving a data stream 815. Additionally, in this scenario, the application 810 is being used to create a drawing 820 through the use of a cursor 825. To clarify, the cursor 825 is being used to draw the drawing 820. Based on these drawing actions, the data stream 815 includes a number of cursor operations (e.g., a mouse click, drag, drop, etc.). These operations may constitute events. By executing a set of queries against the data stream 815, the embodiments are able to identify specific events and trigger the push component 805. Once triggered, the push component 805 is able to push those events to a remote computer system so those events can be viewed (i.e. responded to) on the remote computer system.

As an example, FIG. 8 shows a client 830 that includes a browser 835 and a client 840 that includes a browser 845. By following the principles disclosed herein, when the cursor drawing events are identified and the push component 805 is triggered, these cursor drawing events will be pushed and will be made viewable on the browsers 835 and 845. In this manner, the clients 830 and 840 will be able to almost immediately (i.e. within mere milliseconds) view the cursor drawing events as those events are occurring. As a result, the drawing 820 will be viewable on the browsers 835 and 845 as it is being created. Furthermore, the process of creating the drawing 820 (e.g., drawing the eyes, nose, and mouth) will also be viewable in real-time as those processes are occurring (e.g., the clients 830 and 840 will be able to view, in real-time, the eyes, nose, and mouth as they are drawn). Accordingly, the disclosed embodiments may be practiced in a broad array of situations.

By following these principles, some of the disclosed embodiments are able to perform real-time event stream processing and to push identified events to remote computer systems. As discussed earlier, the embodiments provide significant advantages over the art because they are able to push events to recipients in an extremely fast manner. As a consequence, other entities (e.g., developers) are able to discern the immediate status (e.g., a health status) of the network. By acquiring the data using the principles disclosed herein, the embodiments help ensure that a network system is operating in an expected manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are structured to be executable by the one or more processors to thereby cause the computer system to:
      receive one or more first event characteristics from a first remote computer system, the one or more first event characteristics being event characteristics that the first remote computer system is to be notified of;
      receive one or more second event characteristics from a second remote computer system, the one or more second event characteristics being event characteristics that the second remote computer system is to be notified of;
      access a data stream that includes a plurality of events;
      apply one or more filtering operations on the plurality of events of the accessed data stream, the one or more filtering operations selecting a subset of the plurality of events that is less than the plurality of events based on one or more of event header type, event size, event protocol, or event address; and
      after applying the one or more filtering operations on the plurality of events, execute one or more query operations on the subset of the plurality of events of the accessed data stream, including:
         identifying one or more first events in the subset of the plurality of events that includes at least one of the one or more first event characteristics that the first remote computer system is to be notified of, and pushing the one or more first events to the first remote computer system so that the one or more first events are responded to at the first remote computer system; and
         identifying one or more second events in the subset of the plurality of events that includes at least one of the one or more second event characteristics that the second remote computer system is to be notified of, and pushing the one or more second events to the second remote computer system so that the one or more second events are responded to at the second remote computer system.

2. The computer system of claim 1, wherein accessing the data stream is performed without storing at least some of the pushed events.

3. The computer system of claim 1, wherein pushing an event to a remote computer system is performed by a callback that resides on the computer system.

4. The computer system of claim 3, wherein the callback is registered with the remote computer system.

5. The computer system of claim 1, wherein a server component at the computer system executes the one or more query operations, the server component being attached to a port of the computer system, the port being used to stream the data stream.

6. The computer system of claim 1, receiving the one or more first event characteristics comprises receiving a set of queries from the first remote computer system, the set of queries defining the one or more first event characteristics that the first remote computer system is to be notified of.

7. The computer system of claim 1, wherein the one or more first events comprises a plurality of events that are pushed to the first remote computing system, the pushing of the plurality of events not being confined to an order of the events within the data stream.

8. The computer system of claim 7, the plurality of pushed events being pushed by multiple push components that each perform a query operation with respect to the subset of the plurality of events.

9. The computer system of claim 1, wherein the one or more first events are pushed to a web browser of the first remote computer system, the web browser being registered with the computer system.

10. The computer system of claim 1, wherein a communication connection is maintained between the computer system and the first remote computer system while the data stream is being streamed, and wherein pushing the one or more first events to the first remote computer system is performed using the communication connection.

11. A method for performing event processing on a data stream that includes a plurality of events, the method being implemented by a computer system that includes one or more processors, the method comprising:
   receiving one or more first event characteristics from a first remote computer system that are to be searched for within the data stream, the one or more first event characteristics being event characteristics that the first remote computer system is to be notified of;
   receiving one or more second event characteristics from a second remote computer system that are to be searched for within the data stream, the one or more second event characteristics being event characteristics that the second remote computer system is to be notified of;
   accessing the data stream, which includes a plurality of events;
   applying one or more filtering operations on the plurality of events of the accessed data stream, the one or more filtering operations selecting a subset of the plurality of events that is less than the plurality of events based on one or more of event header type, event size, event protocol, or event address; and
   after applying the one or more filtering operations on the plurality of events, executing one or more query operations on the subset of the plurality of events of the accessed data stream, including:
      identifying one or more first events, from within the subset of the plurality of events of the data stream, that include at least one of the one or more first event characteristics, and pushing the one or more first events to the first remote computer system so that the one or more first events are responded to at the first remote computer system; and
      identifying one or more second events, from within the subset of the plurality of events of the data stream, that include at least one of the one or more second event characteristics, and pushing the one or more second events to the second remote computer system so that the one or more second events are responded to at the second remote computer system.

12. The method of claim 11, wherein accessing the data stream is performed without storing at least some of the pushed events.

13. The method of claim 11, wherein a server component that is residing in memory on the computer system identifies the one or more first events from within the data stream, the server component being attached to a port of the computer system, which port is used to stream the data stream.

14. The method of claim 13, wherein the server component executes a query against the data stream to identify the one or more first events.

15. The method of claim 11, wherein pushing the one or more first events to the first remote computer system is performed by a callback residing on the computer system.

16. The method of claim 11, wherein receiving the one or more first event characteristics comprises receiving a set of queries from the first remote computer system, the set of queries defining the one or more first event characteristics that the first remote computer system is to be notified of.

17. The method of claim 11, wherein the plurality of pushed events are pushed by multiple push components that each perform a query operation with respect to the subset of the plurality of events.

18. The method of claim 11, wherein the one or more first events are pushed to a web browser of the first remote computer system, the web browser being registered with the computer system.

19. One or more hardware storage devices having stored thereon computer-executable instructions that are structured to be executable by one or more processors of a computer system to thereby cause the computer system to:

receive one or more first event characteristics from a first remote computer system that are to be searched for within a data stream, the one or more first event characteristics being event characteristics that the first remote computer system is to be notified of;

receive one or more second event characteristics from a second remote computer system that are to be searched for within the data stream, the one or more second event characteristics being event characteristics that the second remote computer system is to be notified of;

access the data stream, the data stream including a plurality of events;

apply one or more filtering operations on the plurality of events of the accessed data stream, the one or more filtering operations selecting a subset of the plurality of events that is less than the plurality of events based on one or more of event header type, event size, event protocol, or event address; and after applying the one or more filtering operations on the plurality of events, execute one or more query operations on the subset of the plurality of events of the accessed data stream, including:

identifying one or more first events from within the subset of the plurality of events of the data stream, that include at least one of the one or more first event characteristics and pushing the one or more first events to the first remote computer system so that the one or more first events are responded to at the first remote computer system; and identifying one or more second events, from within the subset of the plurality of events of the data stream, that include at least one of the one or more second event characteristics, and pushing the one or more second events to the second remote computer system so that the one or more second events are responded to at the second remote computer system.

20. The one or more hardware storage devices of claim 19, wherein accessing the data stream is performed by accessing a port through which the data stream is being transmitted.

* * * * *